United States Patent Office 2,948,927
Patented Aug. 16, 1960

2,948,927

METHOD OF MANUFACTURING FIBROUS AND POROUS MATERIALS

Ole-Bendt Rasmussen, Bilbergs Minde, Taarbaek Strandvej 144, Klampenborg, Copenhagen, Denmark No Drawing. Filed Apr. 29, 1957, Ser. No. 655,521

5 Claims. (Cl. 18—47.5)

The invention relates to a method for the making of textile fibres and other fibrous materials consisting of an orientable high-molecular substance made either synthetically or by the conversion of natural substances.

Several procedures are known aiming at the production of textile fibres by first strongly orienting the direction of the molecules of a thermoplastic foil and then by splitting the foil in conformity with the fissility imparted through the orienting of the molecules. Orientation is produced by stretching and splitting-up through a suitable mechanical process, for instance by rubbing or rolling between a pair of rough surfaces, and by means of an impact mill. By such methods the making of fibrous materials may be simplified, and in some cases also an improvement of quality is obtained.

In connection with splitting-up in an impact mill the incorporation of solid granules in the thermoplastic material is known. These granules must either be leached, thereby creating hollow spaces, or they must remain in the material until splitting-up takes place. In either case the latter is undoubtedly facilitated because the cavities or the granules will give a notch effect, or similar concentrated actions of force, when the foil comes under tension by the impact.

By another method an oriented crystalline thermoplastic material (e.g. polyamide) is split up when in a swelled condition. For the splitting-up acoustic waves are preferably used, and in this way among other things direct contact between the delicate fibrous material and the mechanical agents used for the splitting is avoided.

According to an embodiment of the same method the splitting process is stopped at a stage when the fibres still cohere as a unit forming a network. It is a matter of course that the splitting-up of the oriented material also may be performed in such a way that a great number of small units of coherent fibres are formed.

By the known methods for splitting-up disintegration is produced by an external mechanical force acting on the oriented foil. Experience has shown that it is not possible without damaging the material heavily to form textile fibres from thick foils, nor is it possible to split thin foils into fibres which—on an average—are finer than the thickness of the foil.

An exception from this is an embodiment of the above method, according to which it is possible to make undamaged fibres only a few microns thick on the basis of considerably thicker foils of an oriented crystalline swelled material when orientation has been made in the viscous fluid state and the splitting-up performed by acoustic waves. However, experience has shown that this splitting-up takes place relatively slowly.

In many cases it will be an advantage to use extremely fine fibres for textile purposes as they give particularly soft and warm fabrics, but on the other hand it is for reasons of production a disadvantage to use ultra-thin foils for the process.

Furthermore it has proved impossible to use the known splitting-up methods for the making of undamaged materials with fine open pores on the basis of an oriented substance. Such materials, as well as coherent fiberwork, should be suited for non-woven textiles.

The purpose of the present invention is to split the oriented foils or filaments into thinner undamaged fibres, filaments, or fibrous substances or into an undamaged material with fine open pores.

This result is obtained by bursting the oriented material (a foil, strip, filament, tube or similar body) from within by a pressure exercised by an introduced foreign disperse phase generally consisting in gaseous or viscous matter. This phase may either be introduced beforehand or be formed only in connection with the splitting-up. The pressure exercised by the phase is produced by the influence of a physical or chemical process—for instance the process by which the phase is formed. The physical or chemical process takes place on the basis of substances introduced into the high-molecular matter before or during the splitting up. It is not necessary that the internal pressure alone shall be able to cause the desired disintegration. Concurrently with or preferably after disintegration from within has taken place a supplementary external mechanism processing can take place to make a further splitting-up.

When the procedure according to the invention is used for the splitting-up of oriented foils a great part of the split surfaces formed during the initial disintegration will be approximately parallel to the foil surface and by the subsequent splitting-up proces fibres thinner than the foil will be made, if the splitting-up is carried sufficiently far. If the splitting-up process is not carried far enough but nevertheless sufficiently far to make through-splits a material with fine open pores is made. The splitting-up can easily be performed in such a way that the fibres or the porous material are substantially undamaged (that is without splits which do not follow the direction of orientation). If the procedure is applied to filaments, undamaged fine fibres or material with fine open pores can likewise be made without difficulty.

It lies within the domain of the invention to allow the pressure of the active phase on the oriented material to be lower than that required for the causing of a split, so that an external mechanical processing will be necessary in order to make split spaces at all, when only this pressure facilitates the splitting-up considerably. Experience has shown that a pressure only 25% of that necessary for the creation of an internal split is of material assistance in connection with the mechanical splitting-up. If possible conditions should, however, be chosen such that the pressure from within at any rate is sufficient to start the splitting-up without the aid of any external mechanical processing. In most cases such aid will be necessary to carry through the splitting-up, but the best results are obtained by first letting the disintegration from within work ahead by itself to the greatest possible extent.

The active physical or chemical process is preferably selected in such a way that the split spaces are formed on the basis of fine particles introduced before the high-molecular substance has attained a solid state, but in itself the splitting-up according to the invention may in many cases take place through a spontaneous liberation of a gaseous phase in undetermined places. By some embodiments of the method according to the present invention, the active phase must be present before the splitting-up, but by other embodiments it is formed only in connection with the latter. In the former case the internal process causing the splitting-up consists in an expansion or change in form of the particles of the phase, and in the latter case it is the process of development which is the active process. The fine particles incorporated to determine where the splitting-up is to commence may then according to the circumstances consist of (or contain) the active phase, or contain a substance determining or accelerating the formation of this phase—for instance by participating in the process or by catalysing it—or it can be of such a nature that it can be converted to such a substance. (The conception "particle" is used here to signify matter or substanc of any kind. "Conversion" shall be interpreted so liberally that it comprises for instance also the leaching of a material and the filling afterwards of the empty spaces which have arisen with another material. The incorporation may in certain cases with advantage be made already during the synthesis of the high-molecular substance.

According to the invention the material should be incorporated as homogeneously as possible and also be homogeneous of size if the procedure is to be used for the making of fibres or filaments. When the orientation has been finished the largest area of each particle measured on a cross-section of the direction of orientation should not exceed ten times the cross-sectional area of each of the desired fibres, and their mutual distance should be at least 5 times the degree of fineness of the fibres, and not less than 5 microns. If the particles are bigger, the tensile strength of the fibres is decreased, and if the distance is less, their abrasion resistance will be insufficient. On the other hand each split face which can be made by the internal process itself should be at least one tenth of the cross section which the fibres are to have. (The surfaces of the incorporated particles are here not counted as split faces.) These quantities are to be considered as average dimensions. They are not stated to restrict the invention but only to explain how it should be used in order to obtain fully satisfactory results.

It is generally preferable to form the high-molecular substance on the bases of a melt—for instance by extrusion—and to mix the incorporated particles with the high-molecular substance while it is in the molten state. Mixing and forming may also take place while the high-molecular substance is in a dissolved state, but the distribution of the particles may then become less even on account of sedimentation.

Orientation and the external mechanical processing for the splitting-up purpose may take place according to known methods. Between orientation and splitting-up the high-molecular substance may, if required, be chemically converted (for instance, oriented cellulose-acetate may as known be saponified into cellulose without spoiling the orientation). Such a conversion may of course also take place during or after the splitting-up. In some cases the oriented material will shrink during the swelling treatment performed in connection with the splitting-up, and it may then be necessary to re-orient the material. In other cases it may be an advantage to impart the non-split-up material with a stronger orientation than the fibres (or the porous material) should have, and afterwards decrease the orientation by swelling or heat treatment. Properly speaking, it is also within the sphere of the invention first to give the material a weak orientation, then to split it, and finally to give it a stronger orientation.

Many different kinds of chemical or physical processes may be used to produce the splitting-up. By one embodiment of the invention an osmotic process is used thereby that a material is caused to penetrate through the oriented material to the formerly incorporated particles consisting of, or containing, a substance which thereby either is dissolved or swelled very much.

In the former case the high-molecular substance must be relatively unpenetrable for the dissolved, formerly incorporated material.

Thereby is created a liquid, or in certain cases almost solid, disperse phase which, when the osmotic pressure has exceeded the capillar pressure of the phase, will exercise a pressure on the surrounding oriented material and under favorable conditions form very large split spaces. In polyamids and stabilized polyvinylalcohols may for instance be incorporated an easily soluble salt, and the material may then be treated (at an ordinary or increased temperature) with an aqueous swelling agent.

By other embodiments the splitting-up takes place through a chemical process causing a generation of gas in the oriented material. The generation of gas may take place by a reaction between the penetrating substance and the substance of the incorporated particles. It may also take place by a reaction occurring exclusively in or between the penetrating substances, but which is catalysed by an incorporated substance. In the latter case specially large split spaces may be produced as compared with the size of the particles. The best procedure will be to have the catalyst on a porous carrier, among other things to facilitate the release of the air in the oriented material. Finally the generation of gas may be produced by incorporating an easily reacting substance and cause its own transformation by a thermal influence or by irradiation.

The substance must decompose while developing a gas or during such a violent generation of energy that a development of gas takes place in the immediate surroundings. Explosives, for instance, can be used. The reaction may be started by passing the oriented substance quickly through a powerful furnace operated dielectrically or by supersonics or by other irradiation. The particles and the method of treatment may be chosen in such a way that the energy is absorbed selectively by the particles. Thereby substances can be used which react at a higher temperature than the melting point of the high molecular material, and which therefore can be incorporated while this substance is in a molten state. In some cases it is also possible to allow the easily reacting substance to penetrate into the high-molecular material after the latter has solidified and there be absorbed on or absorbed by the formerly incorporated particles.

The splitting-up may also take place by evaporation or expulsion of a foreign matter either by a thermal process or by decrease of the pressure of the surroundings. The volatile which is evaporated or expelled may be a substance which is comparatively insoluble in the high-molecular substance and which beforehand has been dispersed in the latter. It may also be a substance dissolved in the high-molecular material. In the latter case evaporation must of course take place very quickly. By this embodiment the incorporation of porous (for instance gelous) particles, or the introduction of fine pores to facilitate the release of steam or gases is preferred, but this is, however, not necessary. In a similar way the material may be split up by letting a previously introduced disperse gaseous phase expand by heating or by decrease of pressure.

The evaporation, expulsion, or expansion causing the split-up may be performed by causing a gaseous substance to penetrate under an increased pressure through the oriented material into the previously formed fine hollow spaces or porous particles, which might contain a fluid in which the gas in question can dissolve, and afterwards decrease the pressure suddenly. The varying conditions of pressure may best be produced by passing the oriented material through one or more zones with different but individually taken constant pressures. The material may pass through the zones between lips which need not close fully around the material, when only the different pressures of the zones are maintained by an air pump.

The evaporation, expulsion, or expansion of gas causing the split-up may also be produced by changes of pressure in an acoustic field. According to the invention splitting-up can therefore be performed by means of powerful sound or supersonic waves, preferably in a bath, after the introduction into the high-molecular substance of a dispersed gaseous or very volatile phase (this gaseous phase may in some cases be chemically produced concurrently with the acoustic treatment). Sound and supersonic waves within the frequency range 1–200 kilocycles are preferable. These waves—particularly those on the lowest frequency stage—are at the same time acting as an external splitting-up factor on the oriented material. Preferably the acoustic treatment is finished at a frequency between 5 and 20 kilocycles but to commence it at a higher frequency where the material in the main is split up by virtue of the internal evaporation, expulsion or gas expansion produced by the acoustic field.

The dispersed gaseous phase may be introduced in the shape of porous particles, by leaching, or by osmosis of incorporated granules and subsequent drying, or by a selective dielectric or acoustic heating of incorporated granules until the immediate surroundings of the high-molecular material are destroyed or evaporated.

So far it is also possible to whisk gas into the molten, high-molecular material, if required while evaporating a volatile substance dissolved in the former, but in this way it is difficult to form sufficiently fine pores.

It is of course an advantage to let as great a part of the introduced hollow spaces as possible be occupied by the gases which are to be expelled by the acoustic treatment, but experience has shown that even traces of gases have a relatively large influence. It must be assumed that traces of the dispersed gaseous phase always will remain, even if all gases apparently have been expelled by treating the material over a long period with a fluid which can penetrate into the pores. Therefore any acoustic splitting-up for the formation of the materials of the nature previously defined will fall within the scope of the invention, when the material beforehand contains hollow spaces known to have contained a gaseous phase at any rate at an earlier stage.

If a coherent net-work of fibrous material with regular and predetermined size of mesh is required, it is according to the invention possible to make a violent split-up from within, for instance by a vigorous evaporation or expulsion, or by a splitting-up by means of incorporated explosives, the oriented material being kept fixed while passing into the zone in which it is split-up, and thereafter by bringing it to pass unhampered and preferably in a slack state through the zone, and finally by again bringing it to pass through a fixture or the like. The length of the free material must be approximately equal to the desired width of mesh.

The splitting-up may also be produced through a capillary process. In certain cases it is for instance possible to incorporate fine drops of mercury, orient the material, whereby the drops become elongated, and swell the material so much that the drops may again become spherical during breaking or effective deformation of the surrounding substance. Capillary displacement processes may also be used.

Which of the processes to choose in any given case will of course be quite dependent upon the high-molecular material and the character of the fibrous or porous material to be produced. Also the splitting-up speed and the interphasial tensions between the active phase and the high-molecular substance are of importance for the shape of the splits. A slow process and low interphasial tension will favour the formation of long, thin ducts adjusted in the direction of orientation, a quick process and high interphasial tension will give short, broad ducts and open splits.

The embodiments described may be combined in various ways. It may for instance be advantageous first to form long, thin, closed pores by means of an osmotic process, then to introduce a high-pressure gas into these cavities by allowing the material to pass a pressure zone, and finally to expel the gas in a zone where the material is treated with sound- or supersonic waves, and in which the mean pressure is much lower.

Slow acting splitting-up processes (for instance osmosis) being performed without a concurrent external mechanical treatment is best performed discontinuously, the material being in the meanwhile as large spooled units.

It has previously been mentioned that the method according to the invention may also be used for polyamides, polyvinyl alcohol, and regenerated cellulose. It has also proved of high practical value for many other substances, including other vinyl high polymers, polyesters, and cellulose-esters. The invention embodies in its general extension any high-molecular substance which artificially can be imparted with an oriented molecular structure and thereby the capacity of being split-up.

*Example No. 1*

By extrusion a 0.03 mm. thick tubular polycaprolactam foil of circumference 10 cm. is made. In the granulate on the basis of which the foil is produced has been mixed 0.5% dehydrated strontiumchloride or sodium sulphate in the form of a powder with a very homogeneous size of granules, on an average respectively 3 and 5 microns. Microscopy shows that the granules are evenly distributed in the material. The foil is cold-drawn and is kept heated to 180° C. for a few minutes in order to increase the crystallinity, to make the boundary between crystalline and amorphous domains sharper and thereby increase the splitting-up capacity. It is treated for several hours with about 3 N aqueous hydrochloric acid solution which has an effective swelling effect. The concentration of the latter has been determined exactly by experiments aiming at determining the degree of swelling at which the oriented high polymer used has its highest cleaveableness. The foil is again microscoped, and it now turns out to be furrowed by relatively long and ductlike but closed pores adjusted in the direction of orientation. Comparative tests show that the pores increase the splitting-up capacity considerably both when dry and swelled. Part of the oriented foil is cut into narrow bands which—still in the swelled state—are passed through an apparatus or device in which it is rubbed between two skin-surfaces. Thereby it is split into a coherent network of fibres. Many of the fibres have smaller cross-sectional dimensions than the thickness of the oriented foil (which is about 0.015 mm.). Comparative tests show that the pores have had a large influence on the fineness of the fibres.

*Example No. 2*

By extrusion a narrow 0.03 mm. thick band of polyvinylalcohol softened with glycerol and with the same excipients as mentioned in Example No. 1 is made. The band is oriented at an increased temperature and treated with formaldehyde to obtain a better water resistance. It is treated with a weak hydrochloric acid solution, examined as in Example No. 1, and split-up by rolling and rubbing between skin-surfaces. The results of the examinations and the splitting-up are the same as in Example No. 1.

*Example No. 3*

A narrow oriented band of polyvinylalcohol is made as in Example No. 2, however, containing 0.1% activated carbon instead of the easily soluble salts. Cupric sulphate has been precipitated beforehand in the carbon. The granule size is homogeneous, on an average 3 microns. The oriented band is treated with an aqueous solution of hydrochloric acid containing hydrogen peroxide and will thereby become filled with large split cavities which cannot be explained simply as a result of the osmosis caused by the copper sulphate, but must be due to the gas generation which is again due to the fact that the hydrogen peroxide is split catalytically by the latter salt and the carbon.

Example No. 4

By extrusion is made a narrow 0.2 mm. thick band of polyvinylchloride with 1% salicyclic acid added in the form of granules of homogeneous size, on an average 2 microns. The temperature in the plastic substance must all the time be kept under the melting point of the salicyclic acid. The band is strongly oriented at an increased temperature, and part of it is treated for 48 hours by a mixture of ethyl alcohol and acetone. This mixture is to produce an osmotic split-up around the salicyclic acid granules. It duly turns out that the band is filled with pores, and after drying it can be split up into fine fibres by being rubbed and rolled between two rubber surfaces. The part of the oriented band which has not been treated with the penetrating liquid mixture is for comparison also attempted to be split-up into fibres by means of the rubber surfaces, the attempt will be unsuccessful.

Example No. 5

A band consisting of especially high polymerized polycaprolactam without any additive ($k$-value 95) is manufactered by extrusion. Immediately afterwards while it is still melted or semimelted, it is oriented by means of a pair of rollers rotating contrary-wise pressed against each other. Both are heated to a point near the melting point of the superpolymerisate, preferably a little below that point, but then the process must be carried out so quickly that no crystallisation occurs until the band is oriented. The band is extruded on to one of the two rollers, which it follows until it has passed between them. Then it is transferred to the second roller, this second roller rotates with a peripheral speed multiple of that of the first, by which the band is oriented. In succession to this stretching process, the band, now c. 0.01 mm. thick and c. 10 cm. wide, is led through a cooling set of rollers rotating at the same peripheral speed as the preceding one. The oriented band is annealed for crystallisation in 2 minutes by blowing nitrogen, 186° C. hot, on it and is immersed for a minute in a swelling aqueous hydrochloric acid solution (cf. Example No. 1). The band, which is now very easy to split-up, is suspended slackly in a closed container where it—still in a swelled condition—for a short time is exposed to a pressure of carbon dioxide at 50 ats. The pressure is abruptly released and the band is thereby burst into fine fibres.

Example No. 6

Part of the cold-drawn foil mentioned in Example No. 1, which has been subjected to the osmotic process but not mechanically processed, is cut into narrow bands and split-up as in Example No. 5.

Example No. 7

A narrow, oriented band of polycaprolactam is made as in Example No. 5, however with a content of 0.5% silica gel. The granule size is homogeneous, on an average 1 micron. The gel has beforehand been made water-repellent by known methods. The material is led comparatively tightly through a swelling aqeuous solution of hydrochloric acid free of gases in which it is irradiated by supersonic waves of frequency 60 kilocycles. Hereby it becomes furrowed by split-up fissures. The splitting-up is finished in another bath containing additionally 2% dispersed talc and which is irradiated by sound waves of frequency 10 kilocycles. The band is carried through this bath in a slack condition. Exceedingly fine fibres are produced. A comparative test will show that the porous granules have increased the effect of the acoustic treatment considerably.

The intensity of the waves is in either bath near the maximum value obtainable by atmospheric pressure in a bath of the indicated composition.

Example No. 8

A 0.1 mm. thick oriented filament is made of polycaprolactam containing 1% of the same strontiumchloride preparation as was used in Example No. 1. The oriented filament is made in a similar way as the band in Example No. 5, and it is split-up by an osmotic process in a similar way as in Example No. 1. Thereafter it is leached in water, vacuum dried at 100°—to introduce air into the pores—and acoustically split into fibres as in Examples No. 7.

Examples No. 9

A 0.05 mm. thick foil of polyvinylalcohol with 5% addition of $Ag_2C_2$ is cast from aqueous solution. The grains of $Ag_2C_2$ are all about 0.05 mm. The foil is cut to strips of 5 mm. width which are oriented at an elevated temperature and strongly dried.

Finally each band is passed through an extremely intensive light beam, produced by focusing of the light from a series of arc-lamps, 20 kw. in all. The beam is delimited by a variable shutter, the lenses are water-cooled, and cold air is blown on the strip. Hereby the temperature of the transparent plastic is only slightly elevated whereas the dark explosive grains are brought to detonation, and the material splits.

What I claim is:

1. In a method of producing fibrous materials, the step of assisting the fiberizing of a strongly oriented high-molecular organic material by incorporating a foreign disperse phase capable of exerting a pressure in the material, and activating said disperse phase to produce pressure.

2. In a fiberizing process, the steps of introducing an expandible finely disperse phase into a high-molecular organic orientable material, shaping the material into a stretchable body, strongly orienting the material containing the disperse phase, and causing the disperse phase to expand within the material.

3. In a fiberizing process, the steps of introducing evenly distributed particles of a gas-occluding solid into a high-molecular organic orientable material, forming the resulting material into a stretchable body, strongly orienting the said material containing the disperse phase, and subjecting the oriented material to a treatment causing the occluded gas to expand.

4. In a fiberizing process, the steps of introducing into a high-molecular organic orientable material evenly distributed particles of a substance capable of evolving a gas on contact with a fluid, which is able to penetrate the high-molecular material, shaping the resulting material into a stretchable body, strongly orienting the high-molecular material by stretching, and subjecting it to the action of the said fluid to cause gas to be evolved by contact with the dispersed particles of the introduced substance.

5. In a fiberizing process, the steps of shaping a high-molecular organic orientable material into a stretchable body, strongly orienting the material by stretching, dissolving into the oriented material a substance which is easily converted into a gaseous state, and effecting such conversion of the said substance.

References Cited in the file of this patent

UNITED STATES PATENTS

| | | |
|---|---|---|
| 2,185,789 | Jacque | Jan. 2, 1940 |
| 2,345,144 | Opavsky | Mar. 28, 1944 |
| 2,576,749 | Carpentier | Nov. 27, 1951 |
| 2,578,523 | Llewellyn | Dec. 11, 1951 |
| 2,689,980 | Opavsky | Sept. 28, 1954 |